United States Patent
Harmon et al.

(10) Patent No.: US 12,339,812 B2
(45) Date of Patent: Jun. 24, 2025

(54) METHOD AND SYSTEM FOR FACILITATING DISTRIBUTED ENTITY RESOLUTION

(71) Applicant: JPMorgan Chase Bank, N.A., New York, NY (US)

(72) Inventors: Mike Harmon, Brooklyn, NY (US); Robert Rappa, Berkeley Heights, NJ (US); Chen Trilnik, Long Beach, NY (US); Matthew Lansdell, Worthington, OH (US); Andrew Deng, Long Island, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1 day.

(21) Appl. No.: 18/080,345

(22) Filed: Dec. 13, 2022

(65) Prior Publication Data

US 2023/0214360 A1    Jul. 6, 2023

Related U.S. Application Data (60) Provisional application No. 63/266,416, filed on Jan. 5, 2022.

(51) Int. Cl.
  *G06F 16/174*  (2019.01)
  *G06F 16/11*  (2019.01)

(52) U.S. Cl.
  CPC ........ *G06F 16/1748* (2019.01); *G06F 16/116* (2019.01)

(58) Field of Classification Search
  CPC ............................ G06F 16/1748; G06F 16/116
  See application file for complete search history.

(56) References Cited

U.S. PATENT DOCUMENTS

| | | | |
|---|---|---|---|
| 2009/0024568 A1* | 1/2009 | Al-Omari | G06F 16/2456 |
| 2011/0131199 A1* | 6/2011 | Simon | G06F 16/24542 |
| | | | 707/718 |

(Continued)

FOREIGN PATENT DOCUMENTS

| | | | | |
|---|---|---|---|---|
| CN | 101124578 A | * | 2/2008 | ............. G06Q 40/00 |
| CN | 103761298 B | * | 4/2017 | ....... G06F 17/30129 |

(Continued)

OTHER PUBLICATIONS

Hung Q Ngo, Christopher Ré, and Atri Rudra. 2014. Skew strikes back: new developments in the theory of join algorithms. SIGMOD Rec. 42, 4 (Dec. 2013), 5-16. https://doi.org/10.1145/2590989.2590991 (Year: 2014).*

(Continued)

*Primary Examiner* — Neveen Abel Jalil
*Assistant Examiner* — Hubert Cheung
(74) *Attorney, Agent, or Firm* — GREENBLUM & BERNSTEIN P.L.C.

(57) ABSTRACT

A method for providing data blocking to facilitate distributed entity resolution is disclosed. The method includes receiving data sets from a source, the data sets including records that correspond to an entity; grouping each of the records into a block based on a shared characteristic, the block including a blocking key; converting the block into a data file, the data file corresponding to a predetermined file format; partitioning the data file based on the corresponding blocking key; determining, via a worker node, a potential record pair by using the partitioned data file; and persisting the potential record pair.

12 Claims, 5 Drawing Sheets

(56) References Cited

U.S. PATENT DOCUMENTS

| | | | |
|---|---|---|---|
| 2014/0108459 A1* | 4/2014 | Gaza | G06F 16/278 707/792 |
| 2015/0254329 A1* | 9/2015 | Agarwal | G06F 16/215 707/616 |
| 2015/0269494 A1* | 9/2015 | Kardes | G06F 16/355 706/12 |
| 2016/0026667 A1* | 1/2016 | Mukherjee | G06F 3/0679 707/714 |
| 2016/0103880 A1* | 4/2016 | Attaluri | G06F 16/2255 707/714 |
| 2016/0267135 A1* | 9/2016 | Idicula | G06F 16/24544 |
| 2016/0350375 A1* | 12/2016 | Das | G06F 16/2456 |
| 2017/0052958 A1* | 2/2017 | Manning | G06F 16/285 |
| 2019/0303106 A1* | 10/2019 | Gokhale | G06F 16/258 |
| 2019/0377813 A1* | 12/2019 | Funke | G06F 16/2456 |
| 2022/0197907 A1* | 6/2022 | Prettejohn | G06F 16/24544 |
| 2023/0117461 A1* | 4/2023 | Pasupuleti | G06F 16/2453 707/721 |

FOREIGN PATENT DOCUMENTS

| | | | |
|---|---|---|---|
| CN | 114417408 A | * | 4/2022 |
| EP | 3133511 | | 2/2017 |
| EP | 2916242 | | 6/2019 |
| KR | 101472257 B1 | * | 12/2014 |

OTHER PUBLICATIONS

International Search Report and Written Opinion issued in International Patent Application No. PCT/US2022/52685, dated Apr. 13, 2023.

\* cited by examiner

METHOD AND SYSTEM FOR FACILITATING DISTRIBUTED ENTITY RESOLUTION

CROSS-REFERENCE TO RELATED APPLICATIONS

This application claims the benefit of U.S. Provisional Patent Application Ser. No. 63/266,416, filed Jan. 5, 2022, which is hereby incorporated by reference in its entirety.

BACKGROUND

1. Field of the Disclosure

This technology generally relates to methods and systems for linking data records, and more particularly to methods and systems for providing data blocking to facilitate distributed processing of entity record linking within and between data sets.

2. Background Information

Many business entities rely on large collections of data such as, for example, entity records to facilitate business operations. Often, the large collections of data come from first-party sources as well as third-party sources in imperfect form due to missing fields, duplicate entries, and inconsistent spellings. Historically, implementation of conventional entity resolution techniques to match entity records across the large collections of data have resulted in varying degrees of success with respect to effective creation of potential record pairs.

One drawback of using the conventional techniques is that in many instances, the number of comparisons necessary for creating the potential record pairs is quadratic in nature. As a result, scaling of the conventional techniques for very large collections of data is very difficult. Additionally, while the conventional techniques may be capable of scaling to moderately sized data collections, the conventional techniques suffer from severe load imbalance in distributed processing environments due to data skew.

Therefore, there is a need to facilitate entity resolution in a distributed processing environment to match entity records effectively and efficiently across the large collections of data.

SUMMARY

The present disclosure, through one or more of its various aspects, embodiments, and/or specific features or sub-components, provides, inter alia, various systems, servers, devices, methods, media, programs, and platforms for providing data blocking to facilitate distributed processing of entity record linking within and between data sets.

According to an aspect of the present disclosure, a method for providing data blocking to facilitate distributed entity resolution is disclosed. The method is implemented by at least one processor. The method may include receiving at least one data set from at least one source, the at least one data set may include at least one record that corresponds to at least one entity; grouping each of the at least one record into at least one block based on a shared characteristic, each of the at least one block may include a blocking key; converting each of the at least one block into at least one data file, the at least one data file may correspond to a predetermined file format; partitioning each of the at least one data file based on the corresponding blocking key; determining, via at least one worker node, at least one potential record pair by using the partitioned at least one data file; and persisting the at least one potential record pair.

In accordance with an exemplary embodiment, the predetermined file format may include a compressed columnar-stored file format that is usable in a distributed processing framework, the compressed columnar-stored file format may relate to a self-described data format that includes data and corresponding metadata.

In accordance with an exemplary embodiment, prior to the partitioning, the method may further include generating, by using the at least one data file, at least one first table and at least one second table, wherein the at least one first table may include a first list of records to search for in a second list of records that correspond to the at least one second table.

In accordance with an exemplary embodiment, partitioning each of the at least one data file may further include sorting the at least one first table according to a blocking column, the blocking column may relate to a column of information in the at least one first table that corresponds to the shared characteristic; partitioning the at least one first table by dividing the at least one first table into a predetermined size based on a result of the sorting; and partitioning the at least one second table based on a subset of information from a data column in the at least one second table.

In accordance with an exemplary embodiment, determining the at least one potential record pair may further include broadcasting the partitioned at least one first table to the at least one worker node; distributing the partitioned at least one second table to the at least one worker node; and determining, via the at least one worker node, the at least one potential record pair by executing at least one joining action based on at least one sub-blocking key.

In accordance with an exemplary embodiment, the method may further include ranking the determined at least one potential record pair based on a corresponding score, the corresponding score may relate to a q-gram based score; and filtering, by using a score threshold, the determined at least one potential record pair to remove false positives, the score threshold may relate to the q-gram based score.

In accordance with an exemplary embodiment, the score threshold may be dynamically adjusted in real-time based on at least one parameter that is associated with the at least one data set.

In accordance with an exemplary embodiment, the method may further include detecting at least one error in the received at least one data set, the at least one error may include at least one from among a missing field error, a duplicate entry error, and an entity name spelling error; and determining an entity resolution process to resolve the detected at least one error, the entity resolution process may include at least one from among a de-duplication process and a record linkage process, wherein the de-duplication process may relate to linking of a plurality of records within a single data set; and wherein the record linkage process may relate to linking of the plurality of records between a plurality of different data sets.

In accordance with an exemplary embodiment, prior to the persisting, the method may further include identifying at least one collection node from among the at least one worker node; and aggregating, via the at least one collection node, the determined at least one potential record pair from each of the at least one worker node.

According to an aspect of the present disclosure, a computing device configured to implement an execution of a method for providing data blocking to facilitate distributed entity resolution is disclosed. The computing device including a processor; a memory; and a communication interface coupled to each of the processor and the memory, wherein the processor may be configured to receive at least one data set from at least one source, the at least one data set may include at least one record that corresponds to at least one entity; group each of the at least one record into at least one block based on a shared characteristic, each of the at least one block may include a blocking key; convert each of the at least one block into at least one data file, the at least one data file may correspond to a predetermined file format; partition each of the at least one data file based on the corresponding blocking key; determine, via at least one worker node, at least one potential record pair by using the partitioned at least one data file; and persist the at least one potential record pair.

In accordance with an exemplary embodiment, the predetermined file format may include a compressed columnar-stored file format that is usable in a distributed processing framework, the compressed columnar-stored file format may relate to a self-described data format that includes data and corresponding metadata.

In accordance with an exemplary embodiment, prior to the partitioning, the processor may be further configured to generate, by using the at least one data file, at least one first table and at least one second table, wherein the at least one first table may include a first list of records to search for in a second list of records that correspond to the at least one second table.

In accordance with an exemplary embodiment, to partition each of the at least one data file, the processor may be further configured to sort the at least one first table according to a blocking column, the blocking column may relate to a column of information in the at least one first table that corresponds to the shared characteristic; partition the at least one first table by dividing the at least one first table into a predetermined size based on a result of the sorting; and partition the at least one second table based on a subset of information from a data column in the at least one second table.

In accordance with an exemplary embodiment, to determine the at least one potential record pair, the processor may be further configured to broadcast the partitioned at least one first table to the at least one worker node; distribute the partitioned at least one second table to the at least one worker node; and determine, via the at least one worker node, the at least one potential record pair by executing at least one joining action based on at least one sub-blocking key.

In accordance with an exemplary embodiment, the processor may be further configured to rank the determined at least one potential record pair based on a corresponding score, the corresponding score may relate to a q-gram based score; and filter, by using a score threshold, the determined at least one potential record pair to remove false positives, the score threshold may relate to the q-gram based score.

In accordance with an exemplary embodiment, the processor may be further configured to dynamically adjust the score threshold in real-time based on at least one parameter that is associated with the at least one data set.

In accordance with an exemplary embodiment, the processor may be further configured to detect at least one error in the received at least one data set, the at least one error may include at least one from among a missing field error, a duplicate entry error, and an entity name spelling error; and determine an entity resolution process to resolve the detected at least one error, the entity resolution process may include at least one from among a de-duplication process and a record linkage process, wherein the de-duplication process may relate to linking of a plurality of records within a single data set; and wherein the record linkage process may relate to linking of the plurality of records between a plurality of different data sets.

In accordance with an exemplary embodiment, prior to the persisting, the processor may be further configured to identify at least one collection node from among the at least one worker node; and aggregate, via the at least one collection node, the determined at least one potential record pair from each of the at least one worker node.

According to an aspect of the present disclosure, a non-transitory computer readable storage medium storing instructions for providing data blocking to facilitate distributed entity resolution is disclosed. The storage medium including executable code which, when executed by a processor, may cause the processor to receive at least one data set from at least one source, the at least one data set may include at least one record that corresponds to at least one entity; group each of the at least one record into at least one block based on a shared characteristic, each of the at least one block may include a blocking key; convert each of the at least one block into at least one data file, the at least one data file may correspond to a predetermined file format; partition each of the at least one data file based on the corresponding blocking key; determine, via at least one worker node, at least one potential record pair by using the partitioned at least one data file; and persist the at least one potential record pair.

In accordance with an exemplary embodiment, the predetermined file format may include a compressed columnar-stored file format that is usable in a distributed processing framework, the compressed columnar-stored file format may relate to a self-described data format that includes data and corresponding metadata.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
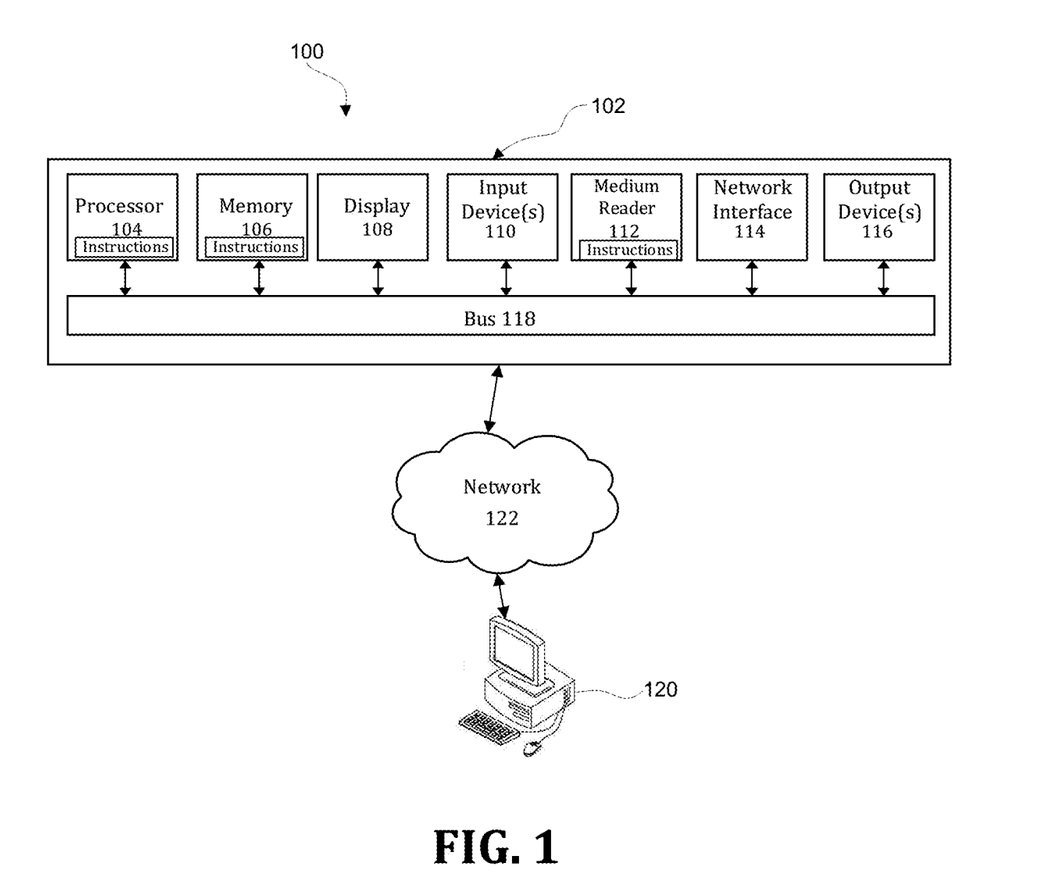
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons of skill in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing data blocking to facilitate distributed processing of entity record linking within and between data sets.

Figure 2:
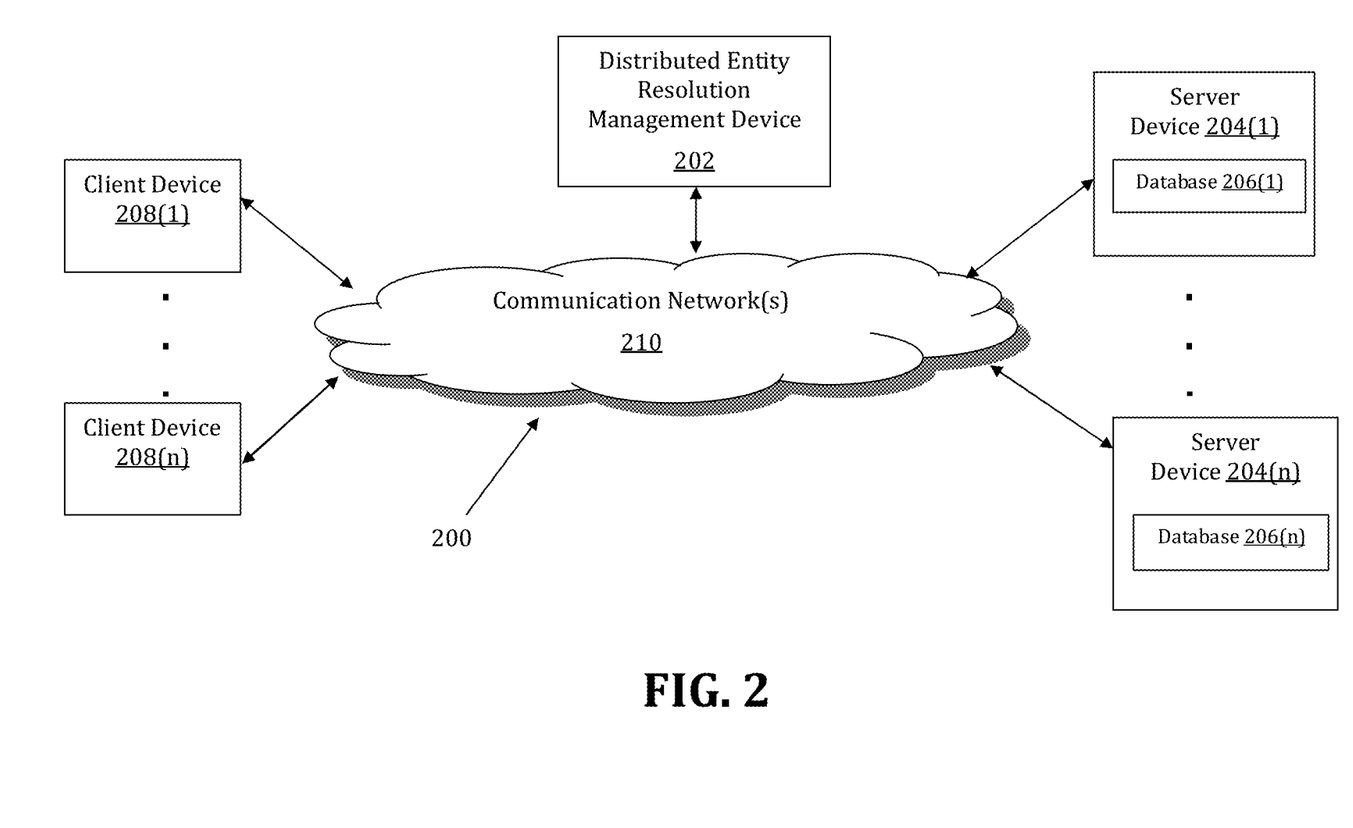
FIG. 2 illustrates an exemplary diagram of a network environment.

Referring to FIG. 2, a schematic of an exemplary network environment 200 for implementing a method for providing data blocking to facilitate distributed processing of entity record linking within and between data sets is illustrated. In an exemplary embodiment, the method is executable on any networked computer platform, such as, for example, a personal computer (PC).

The method for providing data blocking to facilitate distributed processing of entity record linking within and between data sets may be implemented by a Distributed Entity Resolution Management (DERM) device 202. The DERM device 202 may be the same or similar to the computer system 102 as described with respect to FIG. 1. The DERM device 202 may store one or more applications that can include executable instructions that, when executed by the DERM device 202, cause the DERM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DERM device 202 itself, may be located in virtual server(s) running in a cloud-based computing environment rather than being tied to one or more specific physical network computing devices. Also, the application(s) may be running in one or more virtual machines (VMs) executing on the DERM device 202. Additionally, in one or more embodiments of this technology, virtual machine(s) running on the DERM device 202 may be managed or supervised by a hypervisor.

In the network environment 200 of FIG. 2, the DERM device 202 is coupled to a plurality of server devices 204(1)-204(n) that hosts a plurality of databases 206(1)-206(n), and also to a plurality of client devices 208(1)-208(n) via communication network(s) 210. A communication interface of the DERM device 202, such as the network interface 114 of the computer system 102 of FIG. 1, operatively couples and communicates between the DERM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DERM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DERM devices that efficiently implement a method for providing data blocking to facilitate distributed processing of entity record linking within and between data sets.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DERM device 202 may be a standalone device or integrated with one or more other devices or apparatuses, such as one or more of the server devices 204(1)-204(n), for example. In one particular example, the DERM device 202 may include or be hosted by one of the server devices 204(1)-204(n), and other arrangements are also possible. Moreover, one or more of the devices of the DERM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DERM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to entity records, data sets, blocks, blocking keys, blocking columns, data files, data tables, potential record pairs, scores, and score thresholds.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DERM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DERM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DERM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DERM device 202, the server devices 204(1)-204(n), or the client devices 208(1)-208(n), for example, may be configured to operate as virtual instances on the same physical machine. In other words, one or more of the DERM device 202, the server devices 204(1)-204(n), or the client devices 208(1)-208(n) may operate on the same physical device rather than as separate devices communicating through communication network(s) 210. Additionally, there may be more or fewer DERM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
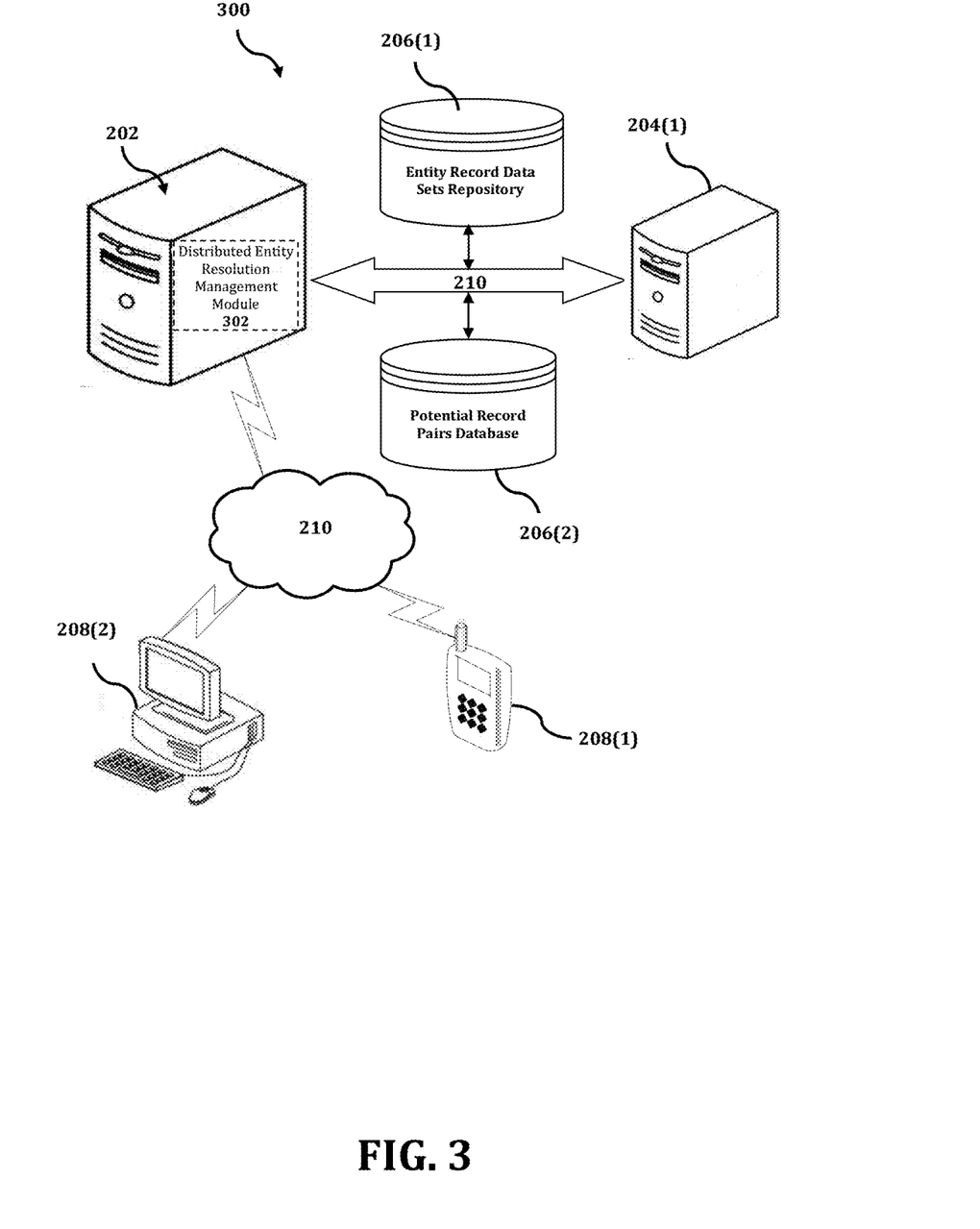
FIG. 3 shows an exemplary system for implementing a method for providing data blocking to facilitate distributed processing of entity record linking within and between data sets.

The DERM device 202 is described and shown in FIG. 3 as including a distributed entity resolution management module 302, although it may include other rules, policies, modules, databases, or applications, for example. As will be described below, the distributed entity resolution management module 302 is configured to implement a method for providing data blocking to facilitate distributed processing of entity record linking within and between data sets.

An exemplary process 300 for implementing a mechanism for providing data blocking to facilitate distributed processing of entity record linking within and between data sets by utilizing the network environment of FIG. 2 is shown as being executed in FIG. 3. Specifically, a first client device 208(1) and a second client device 208(2) are illustrated as being in communication with DERM device 202. In this regard, the first client device 208(1) and the second client device 208(2) may be "clients" of the DERM device 202 and are described herein as such. Nevertheless, it is to be known and understood that the first client device 208(1) and/or the second client device 208(2) need not necessarily be "clients" of the DERM device 202, or any entity described in association therewith herein. Any additional or alternative relationship may exist between either or both of the first client device 208(1) and the second client device 208(2) and the DERM device 202, or no relationship may exist.

Further, DERM device 202 is illustrated as being able to access an entity record data sets repository 206(1) and a potential record pairs database 206(2). The distributed entity resolution management module 302 may be configured to access these databases for implementing a method for providing data blocking to facilitate distributed processing of entity record linking within and between data sets.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DERM device 202 via broadband or cellular communication. Of course, these embodiments are merely exemplary and are not limiting or exhaustive.

Upon being started, the distributed entity resolution management module 302 executes a process for providing data blocking to facilitate distributed processing of entity record linking within and between data sets. An exemplary process for providing data blocking to facilitate distributed processing of entity record linking within and between data sets is generally indicated at flowchart 400 in FIG. 4.

Figure 4:
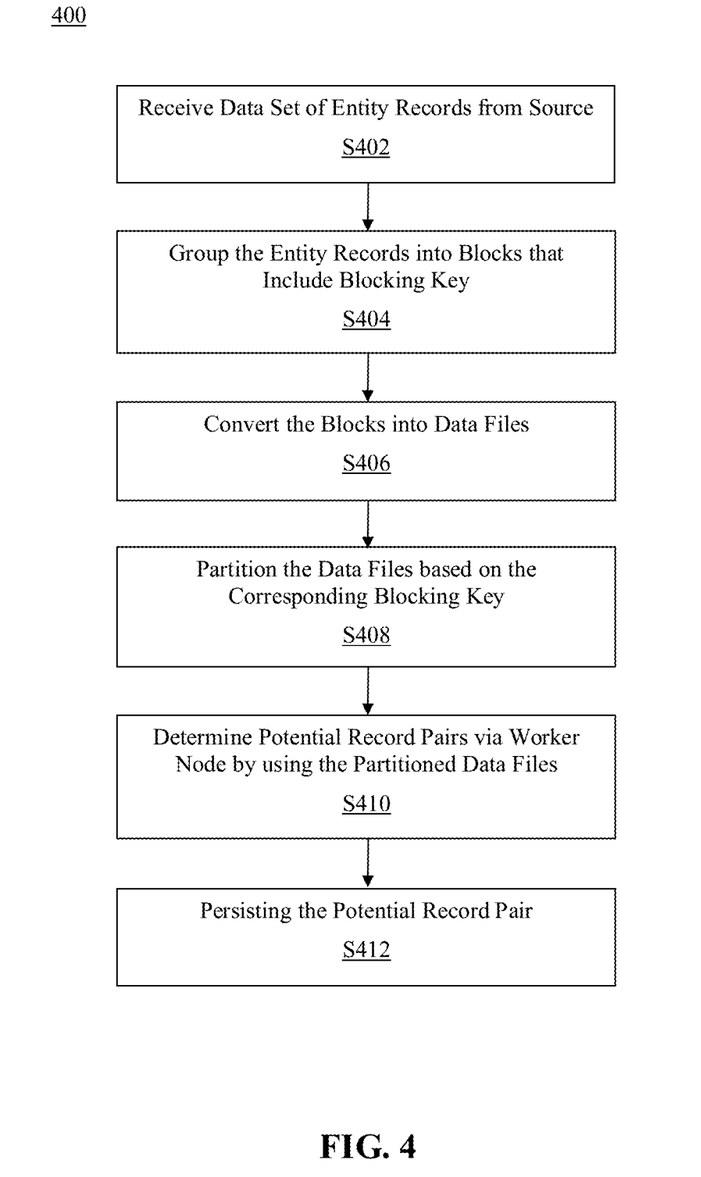
FIG. 4 is a flowchart of an exemplary process for implementing a method for providing data blocking to facilitate distributed processing of entity record linking within and between data sets.

In the process 400 of FIG. 4, at step S402, data sets may be received from a source. The data sets may include records that corresponds to an entity. In an exemplary embodiment, the data sets may include a collection of related sets of information that is composed of separate elements but may be manipulated as a unit by a computing device. For example, the data sets may include a collection of information that corresponds to an entity such as an entity name, an entity identifier, and an entity zip code.

In another exemplary embodiment, the data sets may correspond to structured data that is preprocessed by the source. For example, the source may preprocess the data sets into a desired tabular format prior to transmission. In another exemplary embodiment, the data sets may correspond to unstructured data from the source. The unstructured data in the data sets may be processed and transformed into a desired format such as, for example, a tabular format after receipt from the source. As will be appreciated by a person with ordinary skill in the art, the transformation of the unstructured data set into a structured data set may include parsing the data sets and mapping of data elements.

In another exemplary embodiment, the source may correspond to at least one from among a first-party source and a third-party source. The first-party source may include internal computing systems that aggregate and compile data. For example, the first-party data source may include a client records database. The third-party source may include external computing systems that aggregate and compile data. For example, the third-party data source may include vendors who provide client records for a fee.

In another exemplary embodiment, the data sets may include entity data that is utilized by a business. The data sets may include errors such as, for example, missing fields, duplicate entries, and inconsistent spellings. As such, matching entity records within and across the data sets may be difficult. In another exemplary embodiment, processes for linking entities within and between the data sets may be referred to as entity resolution processes. The entity resolution processes may be broadly differentiated into de-duplication processes and record linkage processes, which aim to solve different problems. The de-duplication processes may relate to linking of records within a single data set. The record linkage processes may relate to a linking of records between different data sets.

In another exemplary embodiment, the entity resolution processes may compute various string similarity scores between corresponding fields within records to determine whether the records represent a similar entity. The pairs of record may be referred to as potential record pairs and when they are determined to refer to the same entity, the pairs of record may be classified as matching and may be referred to as record pairs. In another exemplary embodiment, a rule may be implemented that choses potential record pairs with maximum string similarity scores.

In another exemplary embodiment, the entity resolution processes may include a creating potential record pairs stage and a classifying potential record pairs stage. The creation of potential record pairs may correspond to a challenging aspect of entity resolution as the number of comparisons in the creation is quadratic in nature. The key mechanism for scaling the entity resolution processes may include reducing the number of comparisons by using blocking. In another exemplary embodiment, blocking may aim to group records together into blocks with an assigned blocking key that identifies which block a certain record belongs to. The potential record pairs may be created by only comparing records that share the same block keys, which reduces the number of comparisons.

In another exemplary embodiment, a filtering technique may compare all records and excludes comparisons between the data sets that do not meet a predefined criteria on the string similarity scores from being potential record pairs. Both blocking and filtering processes may reduce the number of potential record pairs and may be used in conjunction. However, only blocking may reduce the number of comparisons that need to be calculated. As data sets become increasingly large, the entity resolution processes may require additional computational resources. For large data sets, distributed computing clusters may be implemented.

At step S404, each of the records may be grouped into a block based on a shared characteristic. Each of the blocks may include a blocking key that is usable to identify the block that a certain record belongs to. In an exemplary embodiment, the grouping of the records into blocks may correspond to a blocking process consistent with disclosures in the present application. The blocking process may reduce the number of comparisons.

In another exemplary embodiment, the block may correspond to a sequence of bytes and/or bits that contains a number of records. The block may include block characteristics such as, for example, a maximum length or a block size. In another exemplary embodiment, the blocked data may be read and/or written as a whole block, which reduces processing overheads and speeds up data-stream handling. The blocked data may also reduce the amount to external storage required for the data.

In another exemplary embodiment, the shared characteristic may correspond to a row and/or column of data within the data sets. The shared characteristic may relate to the collection of information that corresponds to an entity such as an entity name, an entity identifier, and an entity zip code. In another exemplary embodiment, the shared characteristic may be predetermined based on an existing guideline. The existing guideline may include a performance optimization guideline as well as a business optimization guideline. For example, the performance optimization guideline may indicate that a zip code characteristic is processed most optimally. Similarly, the business optimization guideline may correspond to an ad hoc request for characteristics relating to the entity identifier.

At step S406, each of the blocks may be converted into a data file. The data file may correspond to a predetermined file format. In an exemplary embodiment, the predetermined file format may include a compressed columnar-stored file format that is usable in a distributed processing framework. The compressed columnar-stored file format may relate to a self-described data format that includes data and corresponding metadata. In another exemplary embodiment, preprocessing jobs may be utilized to convert the blocks into the data files, which are in compressed columnar-stored file formats that allows for efficient inputs and outputs (I/O).

In another exemplary embodiment, a first table and a second table may be generated. The first table may include a first list of records to search for in a second list of records that correspond to the second table. Consistent with disclosures in the present application, the first table may be referred to as the left table and the second table may be referred to as the right table. For example, the left table may be defined to include the list of records to search for in the list of records in the right table.

At step S408, each of the data files may be partitioned based on the corresponding blocking key. In another exemplary embodiment, partitioning each of the data files may include sorting the first tables according to a blocking column. The blocking column may relate to a column of information in the first table that corresponds to the shared characteristic such as, for example, a zip code column that is used for the blocking. The first table may be partitioned by dividing the data within the first table into a predetermined size based on a result of the sorting. Then, the second table may be partitioned based on a subset of information from a data column in the second table.

In another exemplary embodiment, the data files may be partitioned based on the corresponding blocking key, which allows for conversion of a single join action that is involved in creating the potential record pairs into a multiple join action. During subsequent jobs to create the potential record pairs, the partitioning of the data files may allow for read actions that avoids full data file scans. When combined with the blocking, the partitioning of the data files may minimize cluster network communications. Consistent with disclosures in the present application, any compressed columnar-stored file may be usable to facilitate the partitioning.

In another exemplary embodiment, a hierarchical blocking process may be implemented. The hierarchical blocking process may include partitioning the data files on one blocking key and then performing sub-blocking on related fields when creating potential record pairs. For example, the data files may be partitioned on the first two digits of the zip code corresponding to the records for blocking. Then, the full five digits of the zip code may be usable for sub-blocking. In this instance, the related field to the blocking key, i.e., the first two digits of the zip code, may correspond to the full zip code. The size of the resulting data sets may be reduced consistent with disclosures in the present application by using a q-gram based score threshold to filter out false positives.

At step S410, a potential record pair may be determined via a worker node by using the partitioned data file. In an exemplary embodiment, determining the potential record pair may include broadcasting the partitioned first table to the worker node. The partitioned second table may also be distributed to the worker node. Then, the potential record pair may be determined via the worker node by executing a joining action based on a sub-blocking key. In another exemplary embodiment, the worker node may correspond to a virtual or a physical computing device. The worker node may be managed by a control plane and may contain the services necessary to execute the required actions. Consistent with disclosures in the present application, a plurality of worker nodes may be utilized in the implementation of the claimed invention to facilitate a distributed computing environment.

In another exemplary embodiment, determining the potential record pairs may include the joining of a plurality of data sets that have data skew in the blocking keys. The data skew in the blocking keys may lead to a load imbalance between the plurality of worker nodes. As such, instead of a single joining action, the joining of the data sets may be broken down into multiple joining actions. Breaking down the joining of the data sets into many joining actions allow for redistribution of the skewed and to achieve improved load balancing.

In another exemplary embodiment, the determined potential record pair may be ranked based on a corresponding score. The corresponding score may relate to a q-gram based score that is calculated for the determined potential record pair. In another exemplary embodiment, the determined potential record pair may be filtered by using a score threshold to remove false positives. The score threshold may relate to the q-gram based score that is calculated for the determined potential record pair. In another exemplary embodiment, the score threshold may be predetermined as well as dynamically adjusted based on data set parameters.

At step S412, the potential record pair may be persisted. In an exemplary embodiment, the resulting potential record pairs may be collected on a number of predetermined computing components prior to persistence on a disk. The number of predetermined components may correspond to an optimized number such as, for example, five to ten computing components that is determined to minimize the number of files without increasing downstream runtime.

Figure 5:
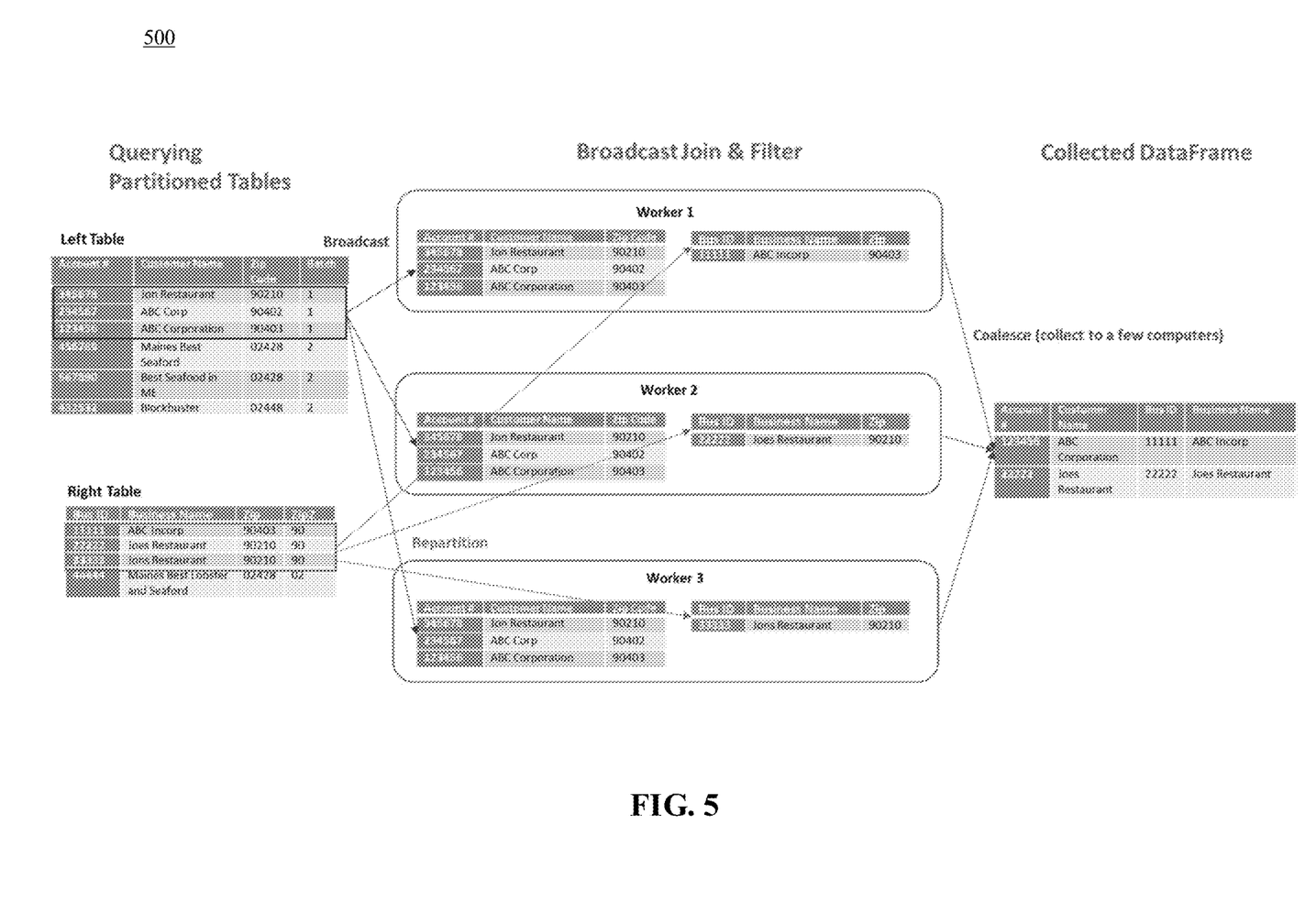
FIG. 5 is a diagram of an exemplary process for implementing a method for providing data blocking to facilitate distributed processing of entity record linking within and between data sets.

FIG. 5 is a diagram 500 of an exemplary process for implementing a method for providing data blocking to facilitate distributed processing of entity record linking within and between data sets. In FIG. 5, the first table may be referred to as the left table and the second table may be referred to as the right table consistent with disclosures in the present application.

As illustrated in FIG. 5, the left table may be defined to include the list of records to search for in the list of records that correspond to the right table. The right table may be partitioned by using a blocking process such as, for example, a standard blocking process where a subset of information from one of the columns in the right table is used for the blocking. The left table may be partitioned by using a blocking process such as, for example, a sorted neighborhood process where the table is sorted according to the blocking column, and the partitions are created by breaking the table up into fixed sizes called neighborhoods. A batch partition may be performed on the column which corresponds to the partitioning in the left table, i.e., both are partitioned on zip code. Each batch partition may then be labeled with an integer and/or a label that is sequential.

In another exemplary embodiment, using batches in the left table of size on the order of tens to hundreds of thousands of records, and partitions in the right table of size on the order of a million records may balance the need to minimize the number of comparisons in creating potential record pairs while avoiding file sizes that are too small.

Consistent with disclosures in the present application, the claimed invention may create the potential record pairs by looping over the batches in the partitioned left table. Each left batch may be represented as a data frame and corresponding blocks in the right table may be read in as another data frame that is repartitioned or redistributed across the worker nodes in the cluster. The data frame of the left batch may often be an order of ten to one hundred times smaller than the data frame of the right table. Therefore, broadcasting the left batch and the right table to each of the worker nodes allows for efficient broadcast joining actions.

The broadcast joining action may be executed by using sub-blocking keys, i.e., matching on five-digit zip codes, to reduce the number of comparisons further. Blocking on additional fields such as, for example, on industry code fields may be performed as a filtering condition. Filtering may also be applied to remove false negatives by using q-gram based scores that correspond to a distance of entity names in the potential record pairs. For each record in the left table, a top "N" potential record pair may be ranked based on results from the prior processes based on the filtered scores. Consistent with disclosures in the present application, the claimed invention may be implemented in any language or parallel processing engine.

The resulting record pairs from the disclosed process are now distributed across all the worker nodes in the cluster. Writing the results to disk at this point may result in one file per worker node on the cluster, which leads to too many small files that adversely affects downstream performance. Collecting all of the results to one worker node would be beneficial but may also increase runtime due to the cost of inter-worker communication and data movement. As such, the results may be collected to a predetermined number of worker nodes such as, for example, five to ten worker nodes before writing to disk. This collection of the results may minimize the number of files without drastically increasing runtime. The reduction in the number of resulting files may improve downstream operation read time by a factor over one hundred.

Accordingly, with this technology, an optimized process for providing data blocking to facilitate distributed processing of entity record linking within and between data sets is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing data blocking to facilitate distributed entity resolution, the method being implemented by at least one processor, the method comprising:

receiving, by the at least one processor, at least one data set from at least one source, the at least one data set including at least one record that corresponds to at least one entity;

grouping, by the at least one processor, each of the at least one record into at least one block based on a shared characteristic, each of the at least one block including a blocking key;

converting, by the at least one processor, each of the at least one block into at least one data file, the at least one data file corresponding to a predetermined file format;

generating, by the at least one processor using the at least one data file, at least one first table and at least one second table, wherein the at least one first table includes a first list of records to search for in a second list of records that correspond to the at least one second table;

partitioning, by the at least one processor, each of the at least one data file based on the corresponding blocking key by, converting, by the at least one processor, at least one single join action in each of the at least one data file into a corresponding multiple join action, wherein the partitioned at least one data file enables a plurality of read actions that avoid a full data file scan;

sorting, by the at least one processor, the at least one first table according to a blocking column, the blocking column relating to a column of information in the at least one first table that corresponds to the shared characteristic;

partitioning, by the at least one processor, the at least one first table by dividing the at least one first table into a predetermined size based on a result of the sorting wherein the at least one first table is partitioned using a standard blocking process where a subset of information from a column of the at least one first table is used for blocking; and partitioning, by the at least one processor, the at least one second table based on a subset of information from a data column in the at least one second table, wherein the at least one second table is portioned using a neighborhood process where the second table is sorted according to the blocking column and partitions are created by breaking the second table into fixed sizes called neighborhoods;

determining, by the at least one processor via at least one worker node among a plurality of worker nodes, at least one potential record pair by using the partitioned at least one data file, wherein the determining of the at least one potential record pair includes joining of a plurality of data sets that have data skew in their blocking keys that leads to a load imbalance between the plurality of worker nodes, wherein the joining of the plurality of data sets that have the data skew includes breaking down the plurality of data sets that have the data skew and performing a plurality of joining actions of the broken down data sets, and wherein determining the at least one potential record pair further comprises:

broadcasting, by the at least one processor, the partitioned at least one first table to the plurality of worker nodes;

distributing, by the at least one processor, the partitioned at least one second table to the plurality of worker nodes; and determining, by the at least one processor via the at least one worker node, the at least one potential record pair by executing at least one joining action based on at least one sub-blocking key;

coalescing the at least one potential record pair determined in each of the plurality of worker nodes in a predetermined set of worker nodes that is larger than one and less than the plurality of worker nodes prior to writing to a disc; and persisting, by the at least one processor, the at least one potential record pair.

2. The method of claim 1, wherein the predetermined file format includes a compressed columnar-stored file format that is usable in a distributed processing framework, the compressed columnar-stored file format relating to a self-described data format that includes data and corresponding metadata.

3. The method of claim 1, further comprising:

ranking, by the at least one processor, the determined at least one potential record pair based on a corresponding score, the corresponding score relating to a q-gram based score; and filtering, by the at least one processor using a score threshold, the determined at least one potential record pair to remove false positives, the score threshold relating to the q-gram based score.

4. The method of claim 3, wherein the score threshold is dynamically adjusted in real-time based on at least one parameter that is associated with the at least one data set.

5. The method of claim 1, further comprising:

detecting, by the at least one processor, at least one error in the received at least one data set, the at least one error including at least one from among a missing field error, a duplicate entry error, and an entity name spelling error; and determining, by the at least one processor, an entity resolution process to resolve the detected at least one error, the entity resolution process including at least one from among a de-duplication process and a record linkage process, wherein the de-duplication process relates to linking of a plurality of records within a single data set; and wherein the record linkage process relates to linking of the plurality of records between the plurality of data sets.

6. A computing device configured to implement an execution of a method for providing data blocking to facilitate distributed entity resolution, the computing device comprising:

a processor;

a memory; and a communication interface coupled to each of the processor and the memory, wherein the processor is configured to:

receive at least one data set from at least one source, the at least one data set including at least one record that corresponds to at least one entity;

group each of the at least one record into at least one block based on a shared characteristic, each of the at least one block including a blocking key;

convert each of the at least one block into at least one data file, the at least one data file corresponding to a predetermined file format;

generate, using the at least one data file, at least one first table and at least one second table, wherein the at least one first table includes a first list of records to search for in a second list of records that correspond to the at least one second table;

partition each of the at least one data file based on the corresponding blocking key by further configuring the processor to:

convert at least one single join action in each of the at least one data file into a corresponding multiple join action, wherein the partitioned at least one data file enables a plurality of read actions that avoid a full data file scan;

sort the at least one first table according to a blocking column, the blocking column relating to a column of information in the at least one first table that corresponds to the shared characteristic;

partition the at least one first table by dividing the at least one first table into a predetermined size based on a result of the sorting wherein the at least one first table is partitioned using a standard blocking process where a subset of information from a column of the at least one first table is used for blocking; and partition the at least one second table based on a subset of information from a data column in the at least one second table, wherein the at least one second table is portioned using a neighborhood process where the second table is sorted according to the blocking column and partitions are created by breaking the second table into fixed sizes called neighborhoods;

determine, via at least one worker node among a plurality of worker nodes, at least one potential record pair by using the partitioned at least one data file, wherein the at least one potential record pair is determined by joining of a plurality of data sets that have data skew in their blocking keys that leads to a load imbalance between the plurality of worker nodes, wherein the joining of the plurality of data sets that have the data skew includes breaking down the plurality of data sets that have the data skew and performing a plurality of joining actions of the broken down data sets, and wherein the at least one potential record pair is determined by:

broadcasting the partitioned at least one first table to the plurality of worker nodes;

distributing the partitioned at least one second table to the plurality of worker nodes; and determining, via the at least one worker node, the at least one potential record pair by executing at least one joining action based on at least one sub-blocking key;

coalesce the at least one potential record pair determined in each of the plurality of worker nodes in a predetermined set of worker nodes that is larger than one and less than the plurality of worker nodes prior to writing to a disc; and persist the at least one potential record pair.

7. The computing device of claim 6, wherein the predetermined file format includes a compressed columnar-stored file format that is usable in a distributed processing framework, the compressed columnar-stored file format relating to a self-described data format that includes data and corresponding metadata.

8. The computing device of claim 6, wherein the processor is further configured to:

rank the determined at least one potential record pair based on a corresponding score, the corresponding score relating to a q-gram based score; and filter, by using a score threshold, the determined at least one potential record pair to remove false positives, the score threshold relating to the q-gram based score.

9. The computing device of claim 8, wherein the processor is further configured to dynamically adjust the score threshold in real-time based on at least one parameter that is associated with the at least one data set.

10. The computing device of claim 6, wherein the processor is further configured to:

detect at least one error in the received at least one data set, the at least one error including at least one from among a missing field error, a duplicate entry error, and an entity name spelling error; and determine an entity resolution process to resolve the detected at least one error, the entity resolution process including at least one from among a de-duplication process and a record linkage process, wherein the de-duplication process relates to linking of a plurality of records within a single data set; and wherein the record linkage process relates to linking of the plurality of records between the plurality of data sets.

11. A non-transitory computer readable storage medium storing instructions for providing data blocking to facilitate distributed entity resolution, the storage medium comprising executable code which, when executed by a processor, causes the processor to:

receive at least one data set from at least one source, the at least one data set including at least one record that corresponds to at least one entity;

group each of the at least one record into at least one block based on a shared characteristic, each of the at least one block including a blocking key;

convert each of the at least one block into at least one data file, the at least one data file corresponding to a predetermined file format;

generate, using the at least one data file, at least one first table and at least one second table, wherein the at least one first table includes a first list of records to search for in a second list of records that correspond to the at least one second table;

partition each of the at least one data file based on the corresponding blocking key by further causing the processor to:

convert at least one single join action in each of the at least one data file into a corresponding multiple join action, wherein the partitioned at least one data file enables a plurality of read actions that avoid a full data file scan;

sort the at least one first table according to a blocking column, the blocking column relating to a column of information in the at least one first table that corresponds to the shared characteristic;

partition the at least one first table by dividing the at least one first table into a predetermined size based on a result of the sorting wherein the at least one first table is partitioned using a standard blocking process where a subset of information from a column of the at least one first table is used for blocking; and partition the at least one second table based on a subset of information from a data column in the at least one second table, wherein the at least one second table is portioned using a neighborhood process where the second table is sorted according to the blocking column and partitions are created by breaking the second table into fixed sizes called neighborhoods;

determine, via at least one worker node among a plurality of worker nodes, at least one potential record pair by using the partitioned at least one data file, wherein the at least one potential record pair is determined by joining of a plurality of data sets that have data skew in their blocking keys that leads to a load imbalance between the plurality of worker nodes, wherein the joining of the plurality of data sets that have the data skew includes breaking down the plurality of data sets that have the data skew and performing a plurality of joining actions of the broken down data sets, and wherein the at least one potential record pair is determined by:

broadcasting the partitioned at least one first table to the plurality of worker nodes;

distributing the partitioned at least one second table to the plurality of worker nodes; and determining, via the at least one worker node, the at least one potential record pair by executing at least one joining action based on at least one sub-blocking key;

coalesce the at least one potential record pair determined in each of the plurality of worker nodes in a predetermined set of worker nodes that is larger than one and less than the plurality of worker nodes prior to writing to a disc; and persist the at least one potential record pair.

12. The storage medium of claim 11, wherein the predetermined file format includes a compressed columnar-stored file format that is usable in a distributed processing framework, the compressed columnar-stored file format relating to a self-described data format that includes data and corresponding metadata.

* * * * *